United States Patent [19]

Geyer

[11] Patent Number: 5,429,489

[45] Date of Patent: Jul. 4, 1995

[54] VOLUMETRIC BLENDING, MIXING AND EXTRUDING OF POLYMER LIKE MATERIALS

[76] Inventor: Paul Geyer, 210B N. Lindell Rd., Greensboro, N.C. 27403

[21] Appl. No.: 184,376

[22] Filed: Jan. 21, 1994

[51] Int. Cl.⁶ .......................... B29B 7/46; B29B 7/48; B29B 7/60
[52] U.S. Cl. ........................ 425/204; 366/84; 366/86; 366/90; 425/205; 425/208; 425/209; 425/582; 425/583
[58] Field of Search ............... 425/204, 207, 208, 209, 425/205, 578, 582, 583; 366/83, 84, 86, 76, 85, 90

[56] References Cited

U.S. PATENT DOCUMENTS

| | | | |
|---|---|---|---|
| 3,078,511 | 2/1963 | Street | 366/84 |
| 4,057,376 | 11/1977 | Berger | 425/204 |
| 4,084,263 | 4/1978 | Millauer | 366/84 |
| 4,107,787 | 8/1978 | Ocker | 366/84 |
| 4,227,870 | 10/1980 | Kim | 425/208 |
| 4,640,672 | 2/1987 | Ellwood | 425/208 |
| 4,752,135 | 6/1988 | Loomens | 425/204 |
| 4,872,761 | 10/1989 | Geyer | 425/208 |
| 4,900,156 | 2/1990 | Bauer | 425/204 |
| 4,983,114 | 1/1991 | Hauck | 366/76 |
| 5,019,310 | 5/1991 | Kobayashi | 425/204 |
| 5,044,760 | 9/1991 | Asai | 366/76 |
| 5,088,914 | 2/1992 | Brambiller | 428/208 |
| 5,266,256 | 11/1993 | Jerman et al. | 366/84 |
| 5,267,788 | 12/1993 | Rockstedt | 425/204 |
| 5,304,054 | 4/1994 | Meyer | 425/208 |

FOREIGN PATENT DOCUMENTS 3-23919 1/1991 Japan .................. 425/578

*Primary Examiner*—Khanh Nguyen
*Attorney, Agent, or Firm*—Dykema Gossett PLLC

[57] ABSTRACT

Side by side extruders provide an extrusion apparatus which has an imposed order of longitudinal displacement of the process material in relation to itself so that cross-shearing is directed to newly aligned material in a manner which achieves volumetric blending with little unproductive shearing. The extrusion apparatus mixes and extrudes polymer like materials with as little waste shearing as possible, so as to preserve the viscosity of the polymer materials and to produce a uniformity processed material of the highest quality possible from the starting materials.

6 Claims, 3 Drawing Sheets

000
VOLUMETRIC BLENDING, MIXING AND EXTRUDING OF POLYMER LIKE MATERIALS

Extrusion flow has been compared to flow through a pipe, first in first out. This is valid, however in a pipe the material contacting the pipe receives the least work, while in an extruder the material contacting the barrel and rotor surfaces is the most active. Temperature stratification develops to the extent that the material forms a cold core surrounded by warmed material. Cross-shearing, in either the pipe or the extruder blends the stratified material. If however, the non-uniformity of the material has length along the extruder groove, cross-shearing can not produce what isn't there. On this basis it is clear that to produce an improved mix, longitudinal displacement of the material is required to make cross-shearing most effective.

Side by side helical groove extruders in close proximity to each other, are used on a sausage stuffer around the year 1880. For purpose of cleaning, the top section of the barrel member was removable. Observed action of the process material between the rotors is similar to a bank of material formed by a two roll mill. The extended material arriving at the bank has to "push" its way into the bank of material as formed between the rotors. This action wastes the work used to extend the material arriving at the bank. Also, a small marble placed between the rotors is conveyed the length of the extruder without being harmed. Although mixing is achieved, the effective use of extrusion shear can be improved. Excessive working of the process material can in some compounds degrade the polymer.

The present invention relates to side by side extruders providing an apparatus which has an imposed order of longitudinal displacement of the process material in relation to itself so that cross-shearing is directed to newly aligned material in a manner which achieves volumetric blending with little unproductive shearing.

SUMMARY OF THE INVENTION

It is the principal feature of the present invention to provide a new and improved extrusion apparatus which mixes and extrudes polymer like materials with as little waste shearing as possible, so as to preserve the viscosity of the polymer materials and to produce a uniformity processed material of the highest quality possible from the starting materials.

Another feature of the present invention is to provide a new and improved apparatus which develops longitudinal displacement of the process polymer like material in relation to itself so that subsequent cross-shearing is directed to newly aligned material in need of cross-shearing.

Still another feature of the present invention is to provide a new and improved apparatus which accomplishes a uniform warming and mixing and which is accomplished with the input work only equal to the work required to warm the process polymer like material to the specified extrusion temperature. This is an adiabatic operation which features no change in extrusion temperature with changes in the screw or in the rotor speed.

A further feature of the present invention is to provide a new and improved apparatus, which due to uniform processing and to the elimination of non-productive shearing, can process the polymer like material in the relatively short extruder and thereby reduce the initial cost of the extrusion equipment.

Another feature of the present invention is to provide a new and improved apparatus which features side by side extruders which can control the rate of cross-shearing of the process polymer like material to the rate of longitudinal displacement thereof to provide an imposed order of mixing which extends the process material uniformly in all three directions and to thereby produce the extrusion with minimum unproductive shearing.

Still another feature of the present invention is to provide a new and improved apparatus which has an imposed order of mixing which uniformly processes the material to an even temperature and thereby eliminates the need of "dwell time" to equalize the temperature.

A further object of the present invention is to provide a new and improved apparatus which eliminates turbulent flow, which is recognized as directing the imposed shear to the path of least resistance, which is the already worked process material.

A still further feature of the present invention is to provide a new and improved apparatus which eliminates the relaxing of the extended material as it reaches the trailing edge of the helical extruder groove.

Still another feature of the present invention is to provide an apparatus which features side by side rotors with adequate capacity to fill and keep full both extruders through the full speed range of the extruders.

A still further feature of the present invention is to provide a new and improved apparatus which features side by side extruders which warms the process polymer like material to the specified extrusion temperature without the need of cooling water or other means of cooling.

A final feature of the present invention is to provide a new and improved apparatus which features side by side extruders each of which has a feed means and is operable to uniformly combine and mix two different process materials or to blend different batches of the same process material.

DESCRIPTION OF THE PREFERRED EMBODIMENT

Figure 1:
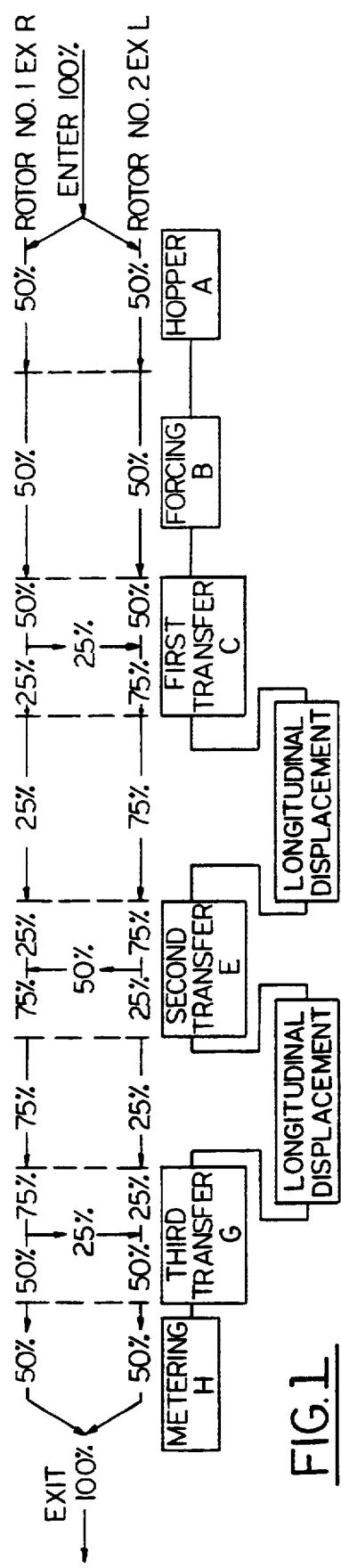
FIG. 1 is a schematic diagram of the extrusion apparatus showing the process material flow in percent of the total flow through the various members of the apparatus.

Referring to FIG. 1, as an introduction to the present invention there is provided a new and improved apparatus with side by side extruders of the rotor and barrel type. Extruder (R) and extruder (L) are viewed from the drive end of the extrusion apparatus. The common hopper or feed means is centrally located and supplies the process material, half apparatus capacity to each of the extruders. The rotors of the hopper A area and the following forcing section B are designed to provide adequate capacity to completely fill both extruders. The forcing section B, of both extruders, consists of helical extrusion grooves adequate to warm, pressurize and transport the process polymer like material to the first transfer mixing section C. The first transfer section C of extruder (R) starts with multiple rotor extrusion grooves which start at full extrusion capacity (50% apparatus capacity) and taper to zero in the downstream direction. The process material entering these grooves which receives the material from the rotor, directs a portion to multiple rotor extrusion grooves at the downstream portion of the first mixing transfer section C and directs the remaining portion to the circumferential barrel groove extruder (L).

The first transfer section C of extruder (L) starts with multiple extrusion grooves, which start at full capacity and increase taper in the downstream direction. The process material entering these grooves from the forcing section B of extruder (L) is forced outward to the co-acting circumferential barrel groove which combines it with material from the circumferential extruder (R) and forces it into multiple rotor grooves at the downstream portion of the first mixing transfer section C of extruder (L).

The first mixing transfer section C is followed by the first longitudinal displacement section D in which extruders (R) and (L) are provided with extrusion grooves of different capacities so as to displace the process material longitudinally in relation to itself. Capacity is measured by volume per turn of the extruder grooves. Extruder (R) receives the material not transferred to extruder (L). Extruder (L) receives the portion of the material transferred from extruder (R), plus all of the material from the forcing section B of extruder (L). A division of the extruder capacity is projected to be in the range of one to three. The typical helical extrusion grooves tend to process the material non-uniformity. This section D is provided to rearrange the materials and therefore use of helical grooves may be an asset.

The first mixing transfer section C transfers material from extruder (R) to extruder (L). In a similar manner the second mixing transfer section E, transfer material from extruder (R) to extruder (R). The second longitudinal displacement section F is provided to rearrange the process material for presentation to the third mixing transfer section G and is similar to the first longitudinal displacement section.

The third mixing transfer section G transfers material from extruder (R) to extruder (L) in the same direction as the first mixing transfer section. It discharges the process material in two equal streams to the final metering pressurizing section H of each extruder.

In the drawings, like reference numbers and letters donate the corresponding part throughout several views of the extrusion apparatus.

Figure 2:
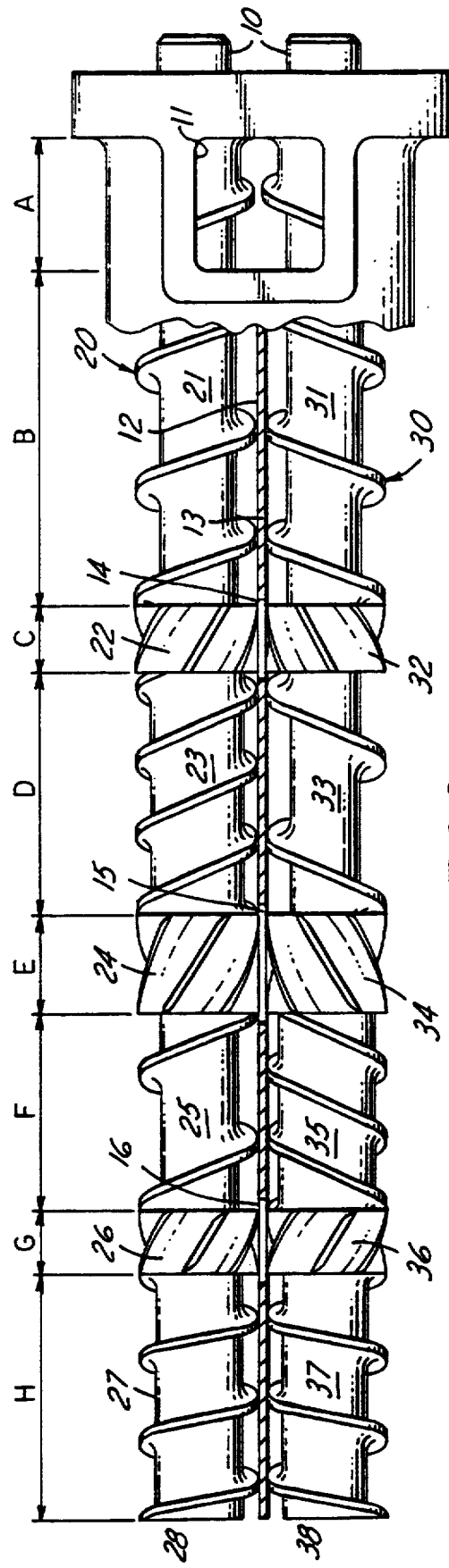
FIG. 2 is a plan view of the extrusion apparatus, partly in section and with the housing broken away.

The apparatus constructed in accordance with the invention is the preferred embodiment as applied to the warming, mixing and extruding of process polymer like material. The apparatus consists of side by side extruders (R) and (L). The apparatus has an elongated barrel housing 12 provided with a pair of longitudinally extending and intersecting bores 13. Each extruder consists of a hopper or hopper section A, a forcing section B, a first transfer mixing section C, a longitudinal displacement section D, a second transfer mixing section E, a longitudinal displacement section F, a third transfer mixing section G and an end discharge or final metering pressuring section H. The drive means 10, rotates the rotors 20 and 30 in a counter-clockwise and clockwise directions within the barrel 12 so as to provide an in-running "bite" between the rotors to "pull" the process material into both extruders. The opening 11 of hopper A is centrally located to serve both extruders (R) and (L). The rotors 20 and 30 are provided with helical extrusion grooves 21 and 31 as shown in FIG. 2. The rotor geometry is increased to provide capacity adequate to fill both extruders.

The rotor 20 has a plurality of extrusion grooves starting with the helical extrusion groove 21 in the forcing section B; extrusion grooves 22 in the first transfer section C; helical extrusion grooves 23 in the longitudinal displacement section D; extrusion grooves 24 in the second transfer section E; helical extrusion grooves 25 in the longitudinal displacement section F; extrusion grooves 26 in the third transfer section G; helical extrusion grooves 27 in the end discharge or metering section H; and the discharge area or extrusion port 28.

The rotor 30 also has a plurality of extrusion grooves, some of a different configuration than the grooves of rotor 20. The rotor 30 has a helical extrusion groove 31 in the forcing section B; extrusion groove 32 in the first transfer section C and which is connected to rotor 20 via the passage 14 provided in the center partition of the barrel 12; helical extrusion grooves 33 in the longitudinal displacement section D; extrusion grooves 34 in the second transfer section E and which are connected to the rotor 20 via the passage 15 provided in the center partition of the barrel 12; helical grooves 35 in the longitudinal displacement section F; extrusion grooves 36 in the third transfer section G and which are connected to rotor 20 via the passage 16; helical extrusion grooves 37 located in the end discharge or meter section H; and the discharge area or extrusion port 38.

Hopper A forms the feed means for the apparatus and consists of dual hoppers, one for each extruder. Each hopper is provided with a ram, not shown, to assist the entering of the process material into the hopper barrel grooves which direct the material downstream into the forcing section B. Also a common hopper may be provided which is centrally located between the two rotors.

Figure 3:
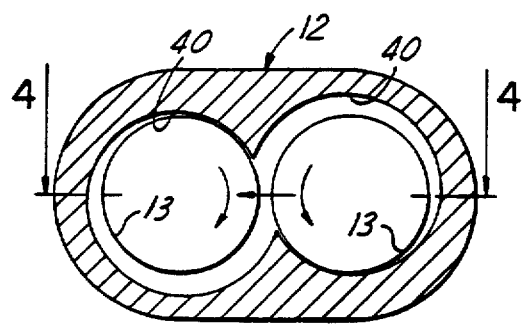
FIG. 3 is a sectional view taken on the line 3—3 of FIG. 4, through the first transfer mixing section of the apparatus, with arrows showing the direction of flow of the process material.
Figure 4:
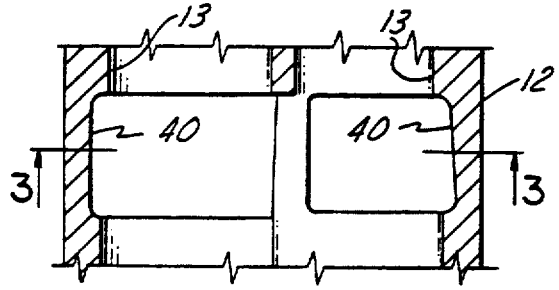
FIG. 4 is a sectional view taken on the line 4—4 of FIG. 3 and showing the barrel of the first transfer mixing section of the apparatus.

The forcing section B of the rotors 20 and 30 have the extrusion grooves 21 and 31 continuous with the hopper grooves and adapted to warm, pressurize and transport the process material to the first transfer mixing section C. The rotor of the first transfer mixing section C of extruder (R) (FIGS. 3-5) has multiple extrusion grooves 41 (FIG. 5) which receive the material from extrusion groove 21 dividing it into multiple strips. Rotational movement of rotor 20 causes the process material in extrusion groove 41 (FIG. 5) to enter the circumferential barrel groove 40, which transport the process material over obstruction 42 and delivers a portion of the process material to multiple rotor grooves 43. The remaining portion of the process material is transported via circumferential barrel groove 40 to the co-acting barrel groove 40 of extruder (L).

Figure 5:
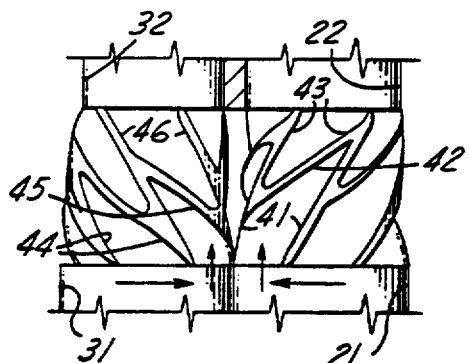
FIG. 5 is an elevational view showing the rotors of the first transfer mixing section of the apparatus.

The multiple rotor extrusion grooves 44 of the first transfer mixing section C, extruder (L) receives the material from extrusion groove 31 dividing it into multiple strips. Rotational movement of rotor 30 causes the process material in extrusion groove 44 to enter circumferential barrel groove 40, which transports it over the obstruction 45, combines it with the process material in extrusion groove 40, from extruder (R), and transfers both streams to multiple rotor grooves 46 (FIG. 5).

Figure 6:
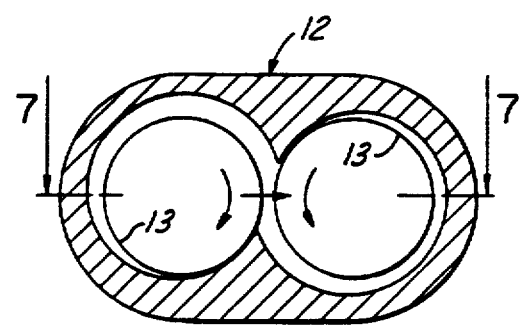
FIG. 6 is a sectional view taken on the line 6—6 of FIG. 7, through the second transfer mixing section of the apparatus, with arrows showing the direction of flow of the process material.
Figure 7:
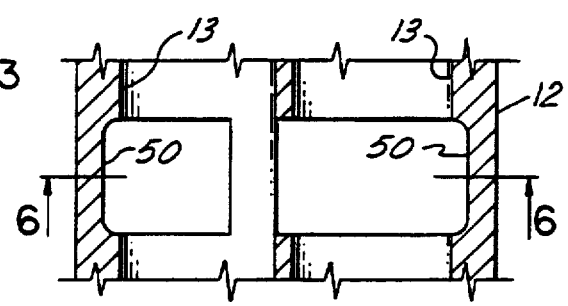
FIG. 7 is a sectional view taken on the line 7—7 of FIG. 6 and showing the barrel of the second transfer mixing section of the apparatus.
Figure 8:
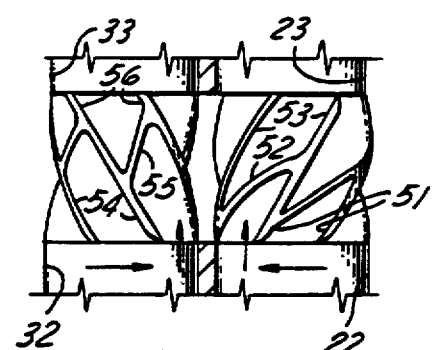
FIG. 8 is an elevational view of the rotors of the second transfer mixing section of the apparatus.

The longitudinal displacement section D of extruder (R) receives the process material from multiple grooves 43 and transports it downstream via the low capacity helical extrusion groove 22 to the multiple rotor grooves 51 of the second transfer mixing section E (FIGS. 6-8).

The longitudinal displacement section D of extruder (L) receives the process material from multiple grooves 46 and transports it downstream via high capacity helical extrusion grooves 32 to the multiple rotor grooves 54. The shorter length of groove 32, as compared to groove 22, causes the process material in groove 32 to move downstream ahead of the process material in groove 22.

The multiple extrusion grooves 51 of the second transfer mixing section E of extruder (R) receives the material from extrusion groove 22 dividing it into strips. Rotational movement of rotor 20 causes the process material in groove 51 to enter circumferential barrel groove 50, which transports it over obstruction 52, combines it with process material from the second transfer mixing section E of extruder (L) and directs both streams to the multiple extrusion grooves 53.

The multiple extrusion grooves 54 of the second transfer mixing section E of extruder (L) receives the material from extrusion groove 32 dividing it into strips. Rotational movement of rotor 30 causes the process material in extrusion grooves 54 to enter the circumferential groove 50, which transports it over the obstruction 55, directs a portion to multiple extruder grooves 53 of extruder (R) and the remaining portion to multiple extruder grooves 56 of extruder (L).

The longitudinal displacement section F of extruder (R) receives the process material from multiple grooves 53 and transports it downstream via a high capacity helical extrusion groove 23 to the multiple rotor grooves 61.

The longitudinal displacement section F of extruder (L) receives the process material from multiple grooves 56 and transports it downstream via low capacity helical extrusion grooves 33 to the multiple rotor grooves 64 of the third transfer mixing section G. The shorter length of groove 23, as compared to groove 33, causes the process material in groove 23 to move downstream ahead of the process material in groove 33.

Figure 9:
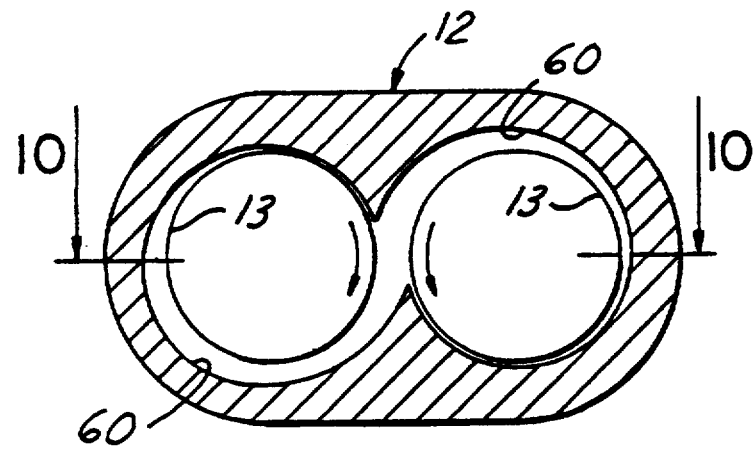
FIG. 9 is a sectional view taken on the line 9—9 of FIG. 10, through the third transfer mixing section of the apparatus.
Figure 10:
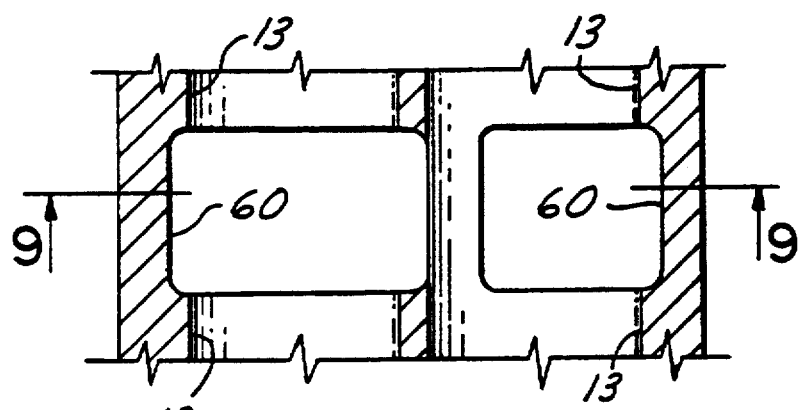
FIG. 10 is a sectional view taken on the line 10—10 of FIG. 9 and showing the barrel of the third transfer mixing section of the apparatus.
Figure 11:
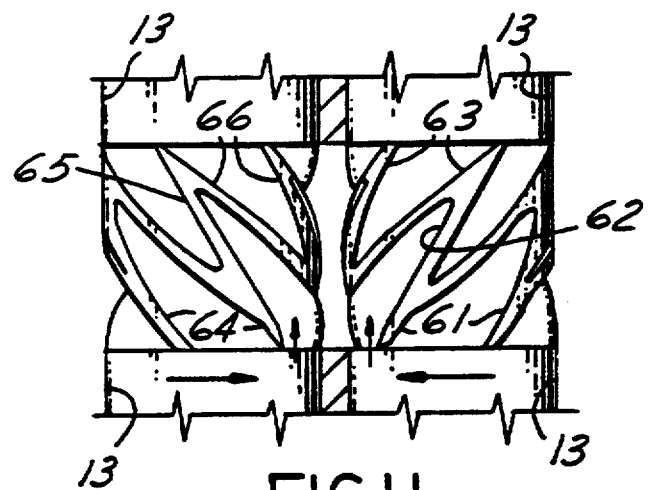
FIG. 11 is an elevational view showing the rotors of the third transfer mixing section of the apparatus.

The multiple extrusion grooves 61 of the third transfer mixing section G of extruder (R) (FIGS. 9-11) receives the process material from extrusion groove 23 dividing it into strips. Rotational movement of the rotor 20 causes the process material in groove 61 to enter circumferential barrel groove 60, which transports it over the obstruction 62, and delivers a portion to multiple rotor grooves 63. The remaining process material is transported via circumferential groove 60 to the co-acting barrel groove 60 of extruder (L).

The multiple extrusion grooves of the third transfer mixing section G of extruder (L) (FIGS. 9-11) receives the process material from extrusion groove 33 dividing it into strips. Rotational movement of rotor 30 causes the process material in groove 64 to enter circumferential barrel groove 60, which transports it over the obstruction 65, combines it with material from extruder (R) and transfers both streams into multiple rotor grooves 66. The end metering section H receives the process material from multiple rotor grooves 63 and 66 (FIG. 11), develops pressure and extrudes the material through a discharge port.

The longitudinal displacement section D of extruder (R) receives its material from rotor extrusion groove 43. Its rotor is provided with three turns of a low capacity helical groove 22. The corresponding extruder (L) receives its material from rotor groove 46. It is provided with a turn and a half of a high capacity helical extrusion groove 32. The design tends to delay the material processed by extruder groove 22 as compared to extruder groove 32. This displacement presents newly aligned material to the second transfer mixing section E.

The second transfer mixing section E of extruder (R) receives its material from rotor groove 22 and divides it into multiple extrusion groove 51. Rotational movement causes the material to leave groove 51, clear obstruction 52 and enter barrel groove 50. Barrel groove 50 also receives material from extruder (L) and combines and directs both streams to the multiple rotor grooves 53.

The second transfer mixing section E of extruder (L) receives its material from rotor groove 32, and divides it into multiple extrusion grooves 54. Rotational movement causes the material to leave rotor groove 54, clear obstruction 55 and enter barrel groove 50 which transfers it to barrel groove 50 of extruder (R). Thus the second mixing transfer section E is provided to rearrange the process material for presentation to the second longitudinal displacement section F which functions in the same way as longitudinal displacement section D. The second longitudinal displacement section F rearranges the process material for presentation to the third mixing transfer section G which transfers the process material from extruder (R) to extruder (L) in the same direction as the first mixing transfer section. The process material is discharged in two equal streams via the extrusion ports 28 and 38 of the final pressurizing metering section H.

The extruder is made in sections which are removable to facilitate the changing of the sections to accommodate new process materials.

The extrusion apparatus disclosed herein is for mixing and extruding thermo plastic and rubberlike materials wherein an imposed order of extrusion shear extends the process material in all three directions to generate uniform volumetric dispersion. The imposed cross-shearing of established material flow lines is generated by the extrusion geometry, which directs the shear to newly aligned material and minimizes shear along the path of least resistance, the already worked process material.

Imposed longitudinally displacement of the material in relation to itself realigns the material for cross-shearing and makes longitudinal blending possible. The imposed order of shearing uniformly warms the material so that "Dwell Time" required to equalize temperature as generated by unequal processing is not required. By eliminating unproductive shearing (and possibly degradation of the polymer) the input work is only equal to the work required to warm the process material to the specified extrusion temperature or adiabatic operation.

Adiabatic operation, provides extrusions which do not change in extrusion temperature throughout the speed range of the extruder. Thus production per extruder can be fifty to one hundred percent higher than present day extruders. This, in addition to the reduced length of extruder required, and the simplification of the cooling system, combine to provide low cost extrusions. More important, product quality improvement can be expected to the extent, that the cost of the extruder is relatively unimportant.

What I claim is:

1. An apparatus for warming, mixing and extruding plastic and rubberlike materials, either hot or cold feed, with a pair of adjacent extruders, said apparatus having a barrel housing provided with a pair of ends including an upstream end and a downstream end and having a pair of elongated cylinder bores extending from one end of the housing to the other end, said cylinder bores of said barrel housing being separated by a common barrel wall, each extruder being provided with an elongated rotor member which is disposed coaxially in one of the cylinder bores in the interior of said barrel housing;
    means providing for relative rotational movement of said rotor member with respect to said barrel housing for the treating and axially advancing of a process material from said upstream end where the process material enters the barrel housing to said downstream end where the process material exists from the barrel housing;
    each of said rotor members and said barrel housing of each extruder having an entrance feed means at said upstream end, a forcing section, one or more mixing transfer sections, one or more longitudinal displacement sections interposed between said mixing transfer sections, and an end discharge section at said downstream end;
    said forcing section of each extruder being provided with one or more helical extrusion grooves capable of warming, pressurizing and transporting the process material to a transfer mixing section;
    said common barrel wall having an opening between opposing portions of said cylinder bores in each mixing transfer section of said adjacent extruders;
    said transfer mixing station having multiple extruder grooves which start at maximum capacity and taper to zero capacity in said downstream direction, and located between said multiple extruder grooves are multiple rotor grooves which start at zero capacity and taper to maximum capacity in said downstream direction;
    said barrel housing being provided with a circumferential barrel groove which provides for the transfer of process material from said multiple rotor groove of one extruder through said opening in said barrel wall to the multiple rotor groove of the other extruder;
    said circumferential barrel groove in addition to the groove transfer providing an extruder to extruder process material transfer by adjusting the circumferential groove depth so that a portion of the process material is transferred from one extruder to the other extruder;
    said longitudinal displacement section downstream of said mixing transfer section having different rates of flow in said adjacent extruders so that the process material is displaced longitudinally in relation to itself; and
    said end discharge section having an extrusion port following said final mixing section of both extruders to provide the pressure required to extrude the process material.

2. An apparatus as defined in claim 1, in which said feed means consists of dual hoppers, one for each extruder, with the bite between the rotors being at the bottom portion of the apparatus.

3. An apparatus as defined in claim 2, in which said hoppers are provided with rams to assist in entering the process material.

4. An apparatus as defined in claim 2, in which the diameter of the rotors of the hoppers and forcing section is enlarged to provide sufficient process material to fill both extruders.

5. An apparatus as defined in claim 1, in which the helical extrusion grooves of the forcing and longitudinal displacement sections are provided with tapered bottoms, with the shallow end located at the upstream edge of the extrusion groove.

6. An apparatus as defined in claim 1, said feed means is a common hopper centrally located between the two rotor members, rotational movement of the rotor members co-act to pull the process material into the barrel housing.

* * * * *